United States Patent
Tsuchiyama et al.

(10) Patent No.: US 9,501,406 B2
(45) Date of Patent: Nov. 22, 2016

(54) STORAGE CONTROL APPARATUS AND STORAGE CONTROL METHOD

(71) Applicant: FUJITSU LIMITED, Kawasaki-shi, Kanagawa (JP)

(72) Inventors: Yukari Tsuchiyama, Kawasaki (JP); Kazuhiko Ikeuchi, Kawasaki (JP); Koutarou Nimura, Kawasaki (JP); Akihito Kobayashi, Kawasaki (JP); Chikashi Maeda, Kawasaki (JP); Kazuhiro Urata, Kawasaki (JP); Takeshi Watanabe, Kawasaki (JP); Guangyu Zhou, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 23 days.

(21) Appl. No.: 14/551,181

(22) Filed: Nov. 24, 2014

(65) Prior Publication Data
US 2015/0161043 A1 Jun. 11, 2015

(30) Foreign Application Priority Data

Dec. 6, 2013 (JP) .................................. 2013-252971

(51) Int. Cl.
*G06F 12/00* (2006.01)
*G06F 12/02* (2006.01)
(Continued)

(52) U.S. Cl.
CPC ........... *G06F 12/0253* (2013.01); *G06F 3/061* (2013.01); *G06F 3/0619* (2013.01); *G06F 3/0653* (2013.01);
(Continued)

(58) Field of Classification Search
CPC .............. G06F 12/0253; G06F 12/0804; G06F 12/0868; G06F 3/0689; G06F 3/0653;
(Continued)

(56) References Cited

U.S. PATENT DOCUMENTS 8,402,226 B1 3/2013 Faibish et al.
2004/0230742 A1 11/2004 Ikeuchi et al.
(Continued)

FOREIGN PATENT DOCUMENTS

JP 2011-192240 9/2011
JP 2012-008651 1/2012
(Continued)

OTHER PUBLICATIONS

Extended European Search Report issued on May 15, 2015 for corresponding European Application No. 14194678.0.

*Primary Examiner* — Kalpit Parikh
(74) *Attorney, Agent, or Firm* — Fujitsu Patent Center

(57) ABSTRACT

A storage control apparatus is communicatively connected to a storage device. The storage device includes a plurality of SSDs. The storage control apparatus includes a processing request controller and a device load detector. The device load detector detects an overload of an SSD by detecting a processing delay of the SSD. When the device load detector has detected an overload of an SSD, the processing request controller suppresses issuance of a request to process writeback with respect to a group by delaying issuance of the write-back.

10 Claims, 18 Drawing Sheets

(51) Int. Cl.
*G06F 3/06* (2006.01)
*G06F 12/08* (2016.01)
*G06F 11/10* (2006.01)

(52) U.S. Cl.
CPC ........... *G06F 3/0659* (2013.01); *G06F 3/0688* (2013.01); *G06F 3/0689* (2013.01); *G06F 11/1076* (2013.01); *G06F 12/0804* (2013.01); *G06F 12/0868* (2013.01); *G06F 2212/1024* (2013.01); *G06F 2212/214* (2013.01); *G06F 2212/262* (2013.01); *G06F 2212/312* (2013.01); *G06F 2212/702* (2013.01); *G06F 2212/7208* (2013.01)

(58) Field of Classification Search
CPC ..................... G06F 3/0619; G06F 3/061; G06F 3/0659; G06F 3/0688; G06F 11/1076; G06F 2212/702; G06F 2212/1024; G06F 2212/214; G06F 2212/262; G06F 2212/312; G06F 2212/7208
See application file for complete search history.

(56) References Cited

U.S. PATENT DOCUMENTS

| | | |
|---|---|---|
| 2009/0063769 A1 | 3/2009 | Daikokuya et al. |
| 2011/0231599 A1 | 9/2011 | Kawamura et al. |
| 2011/0314204 A1 | 12/2011 | Ootsuka et al. |
| 2012/0159051 A1 | 6/2012 | Hida et al. |
| 2014/0075105 A1* | 3/2014 | Colgrove ................ G06F 3/061 711/103 |

FOREIGN PATENT DOCUMENTS

| | | |
|---|---|---|
| JP | 2012-141944 | 7/2012 |
| WO | 2011/092045 | 8/2011 |

* cited by examiner

200 PER-RAID STATISTICAL INFORMATION TABLE

| RAID #1 | WRITE-BACK NUMBER | TIME INTEGRATED VALUE | AVERAGE VALUE |
|---|---|---|---|
| ... | ... | ... | ... |
| t1 | n1 | s1 | a1 |
| t2 | n2 | s2 | a2 |
| t3 | n3 | s3 | a3 |
| ... | ... | ... | ... |
| tn1 | nn1 | sn1 | an1 |
| tn2 | nn2 | sn2 | an2 |
| tn3 | nn3 | sn3 | an3 |

FIG. 13

210 STATISTICAL INFORMATION THRESHOLD CORRESPONDENCE TABLE

| TIME INTEGRATED VALUE | AVERAGE VALUE | CONCURRENT EXECUTION NUMBER THRESHOLD | SSD CONCURRENT EXECUTION NUMBER THRESHOLD |
|---|---|---|---|
| VS1 | VA1 | ET1 | SET11 |
| VS2 | VA2 | ET2 | SET12 |
| VS3 | VA3 | ET3 | SET13 |
| ... | ... | ... | ... |

FIG. 15

PER-CM STATISTICAL
INFORMATION TABLE
230

| CM#1 | WRITE-BACK NUMBER | TIME INTEGRATED VALUE | AVERAGE VALUE |
|---|---|---|---|
| ... | ... | ... | ... |
| t1 | n1 | s1 | a1 |
| t2 | n2 | s2 | a2 |
| t3 | n3 | s3 | a3 |
| ... | ... | ... | ... |
| tn1 | nn1 | sn1 | an1 |
| tn2 | nn2 | sn2 | an2 |
| tn3 | nn3 | sn3 | an3 |

FIG. 17

STORAGE CONTROL APPARATUS AND STORAGE CONTROL METHOD

CROSS-REFERENCE TO RELATED APPLICATION

This application is based upon and claims the benefit of priority of the prior Japanese Patent Application No. 2013-252971, filed on Dec. 6, 2013, the entire contents of which are incorporated herein by reference.

FIELD

The embodiments discussed herein relate to storage control apparatuses and storage control methods.

BACKGROUND

One of the storage devices that may substitute a hard disk drive (HDD) is a solid state drive (SSD). The solid state drive has a garbage collection function to delete unnecessary data. In the solid state drive, the I/O (Input/Output) processing speed decreases once the garbage collection function starts up.

See, for example, Japanese Laid-open Patent Publication No. 2012-141944, Japanese Laid-open Patent Publication No. 2012-8651, and Japanese Laid-open Patent Publication No. 2011-192240.

The start-up timing of the garbage collection function depends on the firmware mounted in a solid state drive, and is unable to be controlled from the firmware of a disk array device (storage device) having the solid state drive mounted thereon.

For example, upon receipt of an I/O request with respect to a RAID (Redundant Array of Independent Disk) group from a host, the disk array device performs control to schedule write-back. A decrease in the I/O processing speed, i.e., an overload state, of one of the solid state drives constituting the RAID group results in a processing delay of the RAID group.

Such a processing delay of the RAID group disturbs the schedule of write-back and degrades the performance of the storage device.

SUMMARY

According to an aspect of the embodiment disclosed herein, there is provided a storage control apparatus which controls write-back of data stored in a write-back cache with respect to a group including a plurality of solid state drives. The storage control apparatus includes one or more processors configured to perform a procedure including: detecting a load of each of the plurality of solid state drives; and suppressing issuance of requests to process the write-back with respect to one or more solid state drives in the group to which a solid state drive from which a predetermined load has been detected belongs, to control the issuance of requests to process write-back with respect to the group and the plurality of solid state drives.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 illustrates an example of a per-RAID statistical information table of the third embodiment;

FIG. 15 illustrates an example of a statistical information threshold correspondence table of the third embodiment;

FIG. 17 illustrates an example of a per-CM statistical information table of the fourth embodiment.

DESCRIPTION OF EMBODIMENTS

Figure 1:
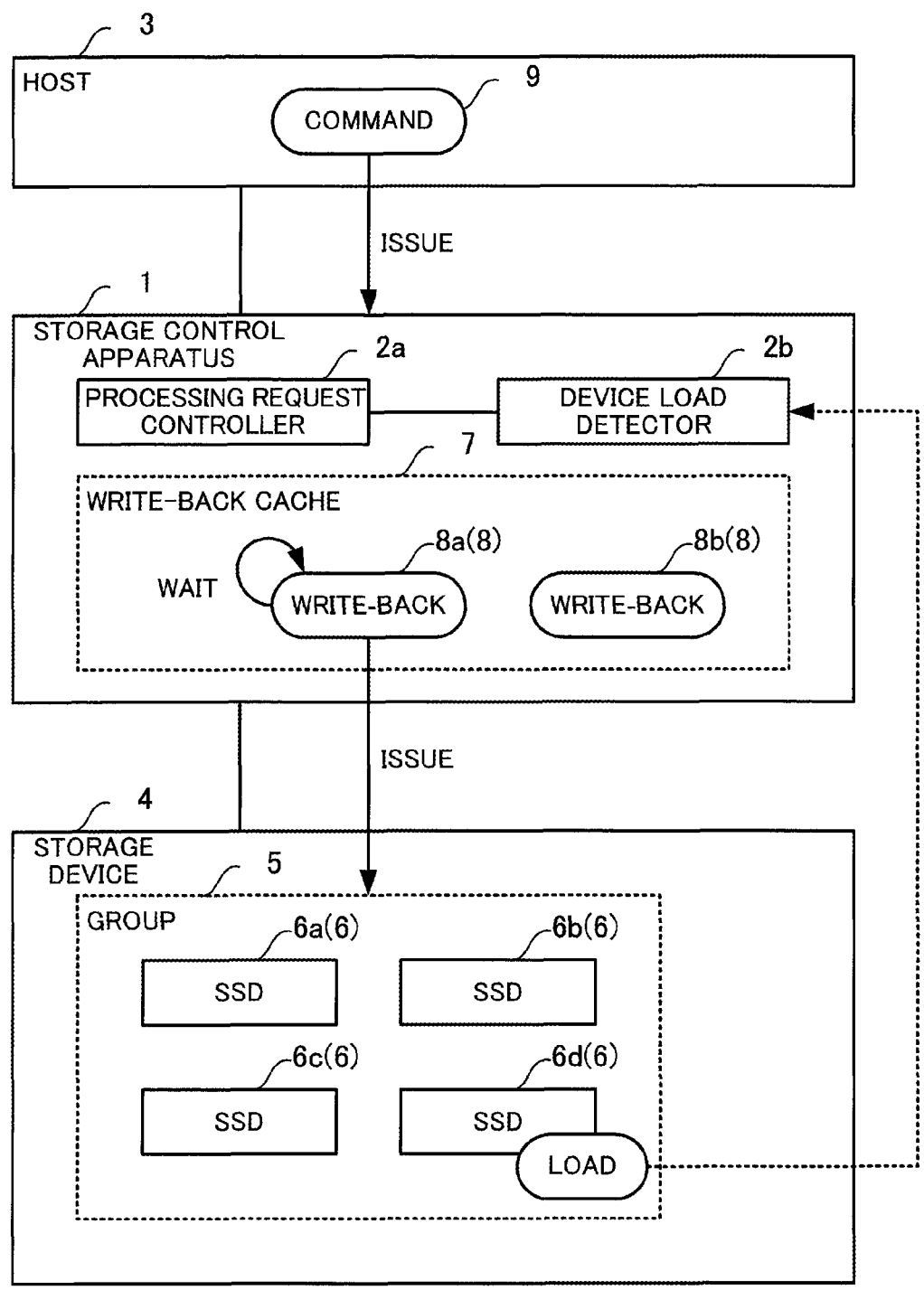
FIG. 1 illustrates an example of the configuration of a storage control apparatus of a first embodiment.

Several embodiments will be described below with reference to the accompanying drawings, wherein like reference numerals refer to like elements throughout.

First Embodiment

First, a storage control apparatus of a first embodiment is described using FIG. 1. FIG. 1 illustrates an example of the configuration of the storage control apparatus of the first embodiment.

A storage control apparatus 1 is communicatively connected to a storage device 4. The storage device 4 is a control target of the storage control apparatus 1. The illustrated storage device 4 is separate from the storage control apparatus 1, but may be integrated therewith.

The storage device 4 includes a plurality of SSDs 6. The storage device 4 is a disk array device, for example. Group 5 is an access unit from a host 3, and includes a plurality of SSDs 6. For example, Group 5 is a RAID group including SSD 6a, SSD 6b, SSD 6c, and SSD 6d. Note that, while the illustrated storage device 4 includes four SSDs 6, the storage device 4 may include two or more SSDs 6. Moreover, while the illustrated Group 5 includes four SSDs 6, Group 5 may include two or more SSDs 6 and is not limited to the Group 5 including, as the constituent elements, all of the SSDs 6 of the storage device 4.

The storage control apparatus 1 is communicatively connected to the host 3. The storage control apparatus 1 controls the storage device 4 upon receipt of a command 9 issued by the host 3. The command 9 is an I/O request with respect to Group 5, and the examples of the command 9 include a write command and a read command.

The storage control apparatus 1, upon receipt of the write command from the host 3, stores write data into a write-back cache 7 and then immediately sends the acknowledgement to the host 3. The storage control apparatus 1 sequentially issues a write-back 8 corresponding to the write data that is stored in the write-back cache 7. That is, the storage control apparatus 1 performs write-back control of data stored in the write-back cache 7, with respect to Group 5 including a plurality of SSDs 6.

The storage control apparatus 1 includes a processing request controller 2a and a device load detector 2b. The processing request controller 2a controls issuance of a request to process the write-back (write-back control) with respect to Group 5 and a plurality of SSDs 6.

The device load detector 2b detects the load of each of a plurality of SSDs 6. That is, each of the plurality of SSDs 6 corresponds to a device whose load is to be detected by the device load detector 2b. For example, the device load detector 2b may detect a predetermined load (e.g., overload) of an SSD 6 by detecting the processing delay of the SSD 6. More specifically, the device load detector 2b may detect the overload of an SSD 6 by comparing the number of commands in a command queue of the SSD 6 with an overload threshold.

The state where an SSD 6d is overloaded is the state where even if Group 5 receives issuance of a request to process the write-back 8a, the completion of the write-back 8a might be delayed due to the delay of I/O processing of the SSD 6d. Such a state is the state where the storage device 4 is unable to exhibit a sufficient performance because SSD 6a, SSD 6b, and SSD 6c respectively are in an idle state while SSD 6a, SSD 6b, and SSD 6c respectively have a room for the I/O processing.

The processing request controller 2a suppresses the issuance of the request to process the write-back 8 with respect to one or more SSDs 6 within Group 5 which an SSD 6, where the device load detector 2b has detected a predetermined load, belongs to.

The processing request controller 2a suppresses the issuance of the request to process the write-back 8 with respect to Group 5 which an SSD 6, where the device load detector 2b has detected a predetermined load, belongs to. For example, when the device load detector 2b has detected an overload of an SSD 6d, the processing request controller 2a suppresses the issuance of a request to process the write-back 8a with respect to Group 5 by delaying issuance of a request to process the write-back 8a.

Thus, the processing request controller 2a may issue a request to process the write-back 8b with a higher priority than issuing a request to process the write-back 8a, for example. Accordingly, the storage control apparatus 1 may suppress a degradation in the performance of the storage device 4 caused by the overloaded SSD 6d.

Note that, the processing request controller 2a may suppress issuance of a request to process the write-back 8 with respect to the SSD 6d whose overload has been detected by the device load detector 2b, and issue a request to process the write-back 8 with respect to SSD 6a, SSD 6b, and SSD 6c.

For example, the processing request controller 2a may limit the suppression target of the issuance of a request to process the write-back 8 with respect to SSD 6d only to a page (data area) related to SSD 6d so as not to set the whole range of the write-back 8 to a suppression target.

In this manner, even if a part of the range of the write-back 8 is set to a suppression target, the data to be suppressed is present on a cache memory. Therefore, for example, even if a request to read from Group 5 is issued, the storage control apparatus 1 may respond to this request.

Second Embodiment

Figure 2:
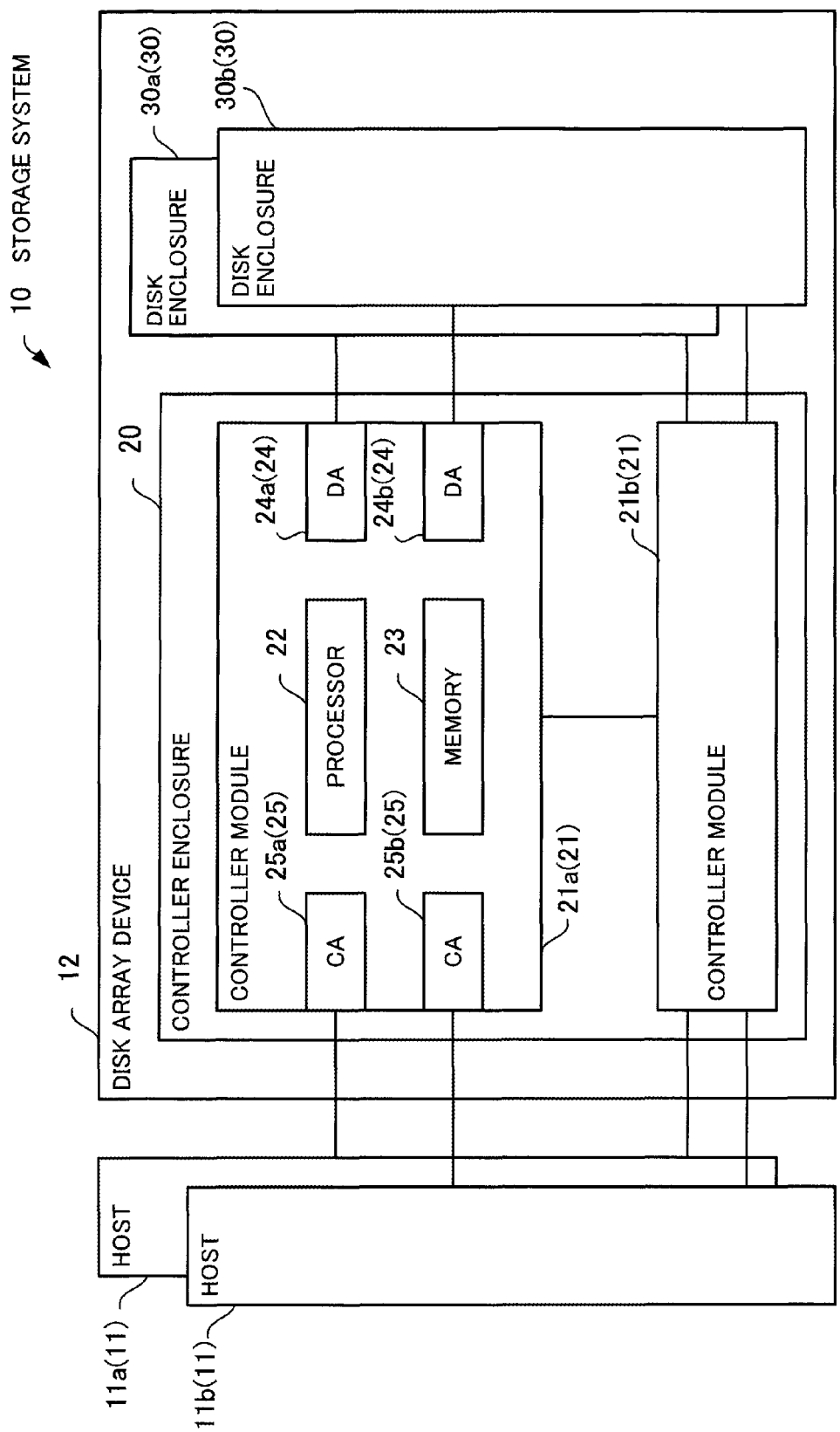
FIG. 2 illustrates a configuration example of a storage system and a hardware configuration example of a disk array device of a second embodiment.

Next, a storage system and the hardware configuration of a disk array device of a second embodiment are described using FIG. 2. FIG. 2 illustrates a configuration example of the storage system and a hardware configuration example of the disk array device of the second embodiment.

The storage system 10 includes a disk array device 12 and a host 11. The disk array device 12 includes a controller enclosure (hereinafter, CE) 20 and one or more disk enclosures (hereinafter, DE) 30. DE 30 is the storage device to house a plurality of SSDs. CE 20 is the storage control apparatus to control DEs 30. Note that DE 30 may be contained in the disk array device 12 or may be external to the disk array device 12. Moreover, while the illustrated disk array device 12 is connected to two DEs; DE 30a and 30b, the disk array device 12 may connect to one DE 30 or three or more DEs 30.

The controller enclosure 20 includes one or more controller modules (hereinafter, CM) 21. The illustrated controller enclosure 20 includes two CMs: CM 21a and 21b. The disk array device 12 has a redundant configuration by CM 21a and CM 21b. Two or more CMs 21 serve as a sharing controller configured to share the issuance of write-back.

CM 21 is a control module configured to totally control the disk array device 12. CM 21 is one form of the storage control apparatus, and receives an I/O request (e.g., a write command, a read command, or the like) from the host 11 and controls SSD. CM 21a includes a processor 22, a memory 23, a DA (Disk Adaptor) 24, and a CA (Channel Adaptor) 25, which are connected via a non-illustrated bus. CM 21a connects via DA 24 to SSD which DE 30 houses, and connects to the host 11 via CA 25.

The processor 22 controls the whole CM 21a. The processor 22 may be a multiprocessor. The processor 22 is a CPU (Central Processing Unit), an MPU (Micro Processing Unit), a DSP (Digital Signal Processor), an ASIC (Application Specific Integrated Circuit), or a PLD (Programmable Logic Device), for example. Moreover, the processor 22 may be a combination of two or more elements of the CPU, MPU, DSP, ASIC, and PLD.

The memory 23 includes a RAM (Random Access Memory) and a nonvolatile memory, for example. The memory 23 has a function as a work memory and cache memory. The memory 23 retains, when data is read from SSD, the data and additionally serves as a queue to temporarily store an I/O request or as a buffer in writing data into SSD. Moreover, the memory 23 stores user data and control information. For example, the RAM is used as a main storage device of CM 21a. At least a part of the program and firmware of an operating system and an application program executed by the processor 22 is temporarily stored on the RAM. Moreover, various types of data needed for the processing by the processor 22 are stored on the RAM.

Moreover, the RAM may include a cache memory separate from a memory that is used for storing various types of data.

The nonvolatile memory retains the memory content even when the power supply of the disk array device 12 is shut off. The nonvolatile memory is, for example, a semiconductor memory, such as an EEPROM (Electrically Erasable and Programmable ROM) and a flash memory, an HDD, or the like. The program and firmware of the operating system, an application program, and various types of data are stored in the nonvolatile memory.

DA 24 performs the interface control (access control) with SSD. CM 21a includes DA 24a which performs the interface control with DE 30a, and DA 24b which performs the interface control with DE 30b. Note that, while the illustrated DA 24 includes two DAs: DA 24a and DA 24b, DA 24 may include one DA or three or more DAs.

CA 25 performs the interface control with the host 11. CM 21a includes CA 25a which performs the interface control with the host 11a and CA 25b which performs the interface control with the host 11b. Note that, while the illustrated CA 25 includes two CAs: CA 25a and CA 25b, CA 25 may include one CA or three or more CAs.

Note that the description of CM 21b is omitted because it is the same as CM 21a.

With such a hardware configuration, the processing function of CM 21 (disk array device 12) of the second embodiment may be realized. Note that the storage control apparatus 1 illustrated in the first embodiment may be also realized with the same hardware configuration as that of CM 21 illustrated.

CM 21 (disk array device 12) implements the processing function of the second embodiment by executing a program stored on a computer-readable storage medium, for example. A program describing the processing content executed by CM 21 may be stored on various storage media. For example, a program executed by CM 21 may be stored on a nonvolatile memory. The processor 22 loads at least a part of the program within the nonvolatile memory onto the memory 23 and executes the program. Moreover, a program executed by CM 21 may be also stored on a portable storage media, such as a non-illustrated optical disk, memory device, or memory card. The examples of the optical disc include a DVD (Digital Versatile Disc), a DVD-RAM, a CD-ROM (Compact Disc Read Only Memory), and a CD-R (Recordable)/RW (ReWritable). The memory device is a storage medium with a function to communicate with a non-illustrated input/output interface or device connection interface. For example, the memory device may write data into a memory card or read data from a memory card using a memory reader and writer. The memory card is a card-type storage medium.

A program stored on a portable storage medium is installed in a nonvolatile memory under the control of the processor 22 and then becomes executable. Moreover, the processor 22 may read the program directly from the portable storage medium and execute it.

Figure 3:
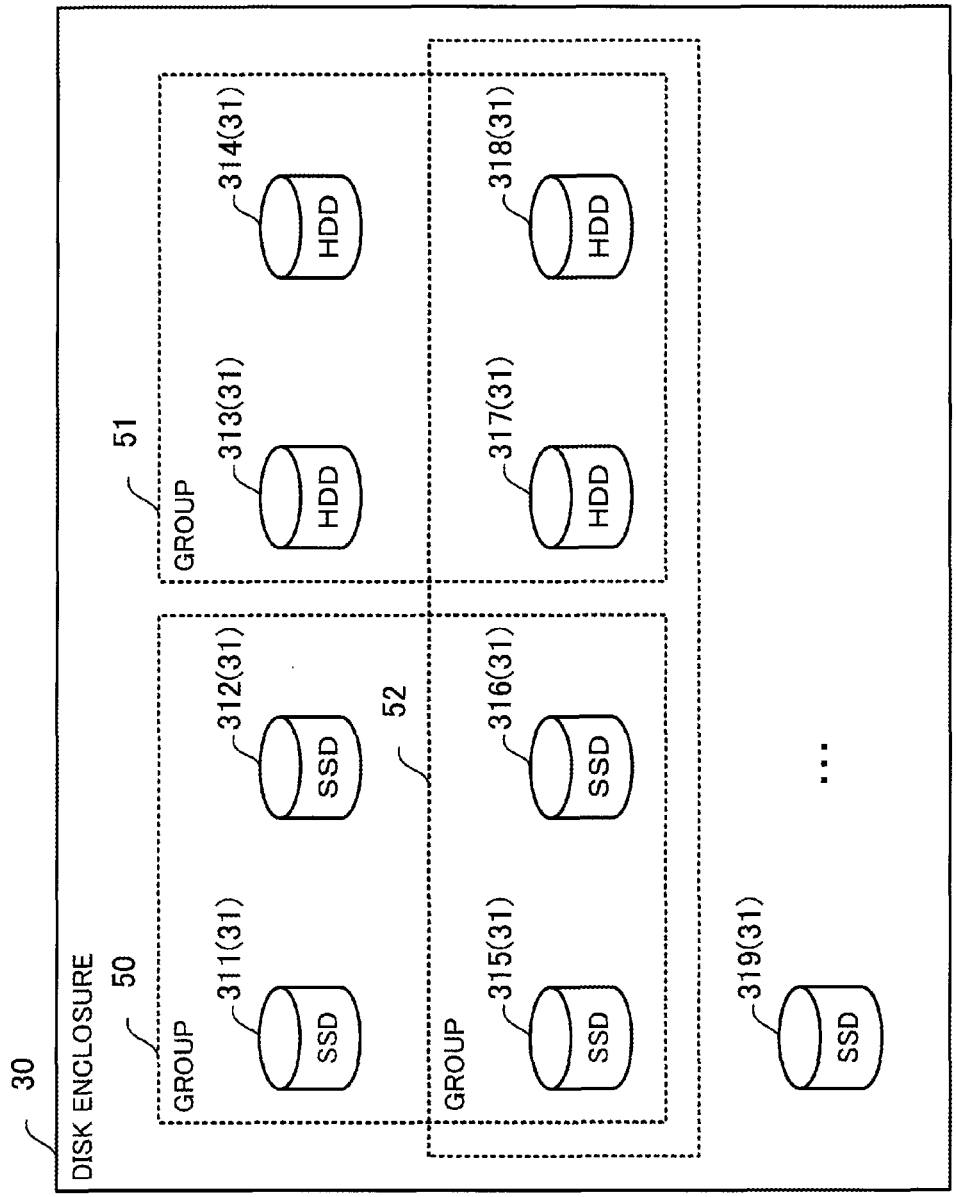
FIG. 3 illustrates an example of a disk enclosure of the second embodiment.

Next, the disk enclosure of the second embodiment is described using FIG. 3. FIG. 3 illustrates an example of the disk enclosure of the second embodiment.

DE 30 includes a plurality of SSDs 31. For example, the illustrated DE 30 includes SSDs 311, 312, 313, . . . , 319, and so on. A plurality of SSDs 31 constitutes a group. For example, each of Groups 50, 51 and 52 constitutes RAID 5. Group 50 includes SSDs 311, 312, 315, and 316. Group 51 includes SSDs 313, 314, 317, and 318. Group 52 includes SSDs 315, 316, 317, and 318. SSD 31 may belong to only one group like SSDs 311, 312, 313, and 314, or may belong to two or more groups like SSDs 315, 316, 317, and 318. Moreover, there may be an SSD 31 that does not belong to any group like SSD 319.

Figure 4:
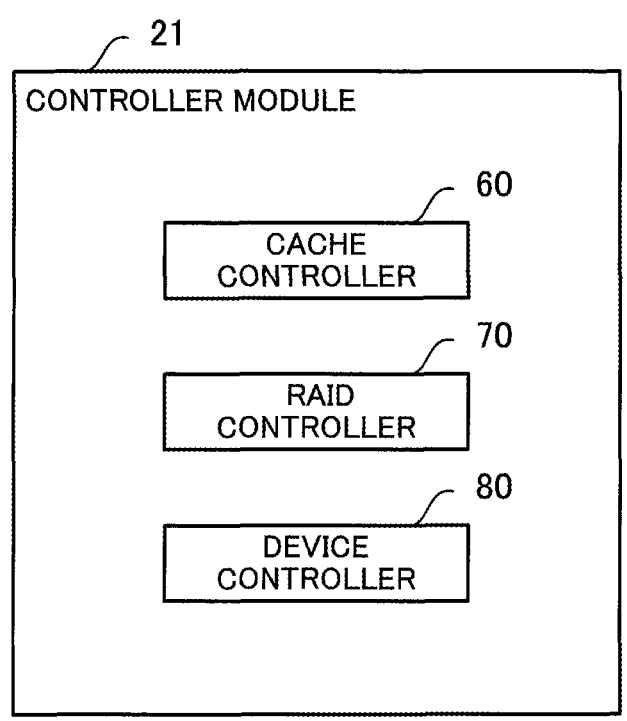
FIG. 4 illustrates an example of the functional configuration of a controller module of the second embodiment.

Next, the functional configuration of the controller module of the second embodiment is described using FIG. 4. FIG. 4 illustrates an example of the functional configuration of the controller module of the second embodiment.

CM 21 includes a cache controller 60, a RAID controller 70, and a device controller 80. The cache controller 60 performs cache control. The RAID controller performs RAID control. The device controller 80 performs access control of SSD 31.

Note that, the cache controller 60 and the RAID controller 70 serve as an interface to work as a bridge between the host 11 and the disk array device 12, and correspond to a front end. Moreover, the device controller 80 serves as an interface to work as a bridge between the cache memory and SSD 31, and corresponds to a back end.

Figure 5:
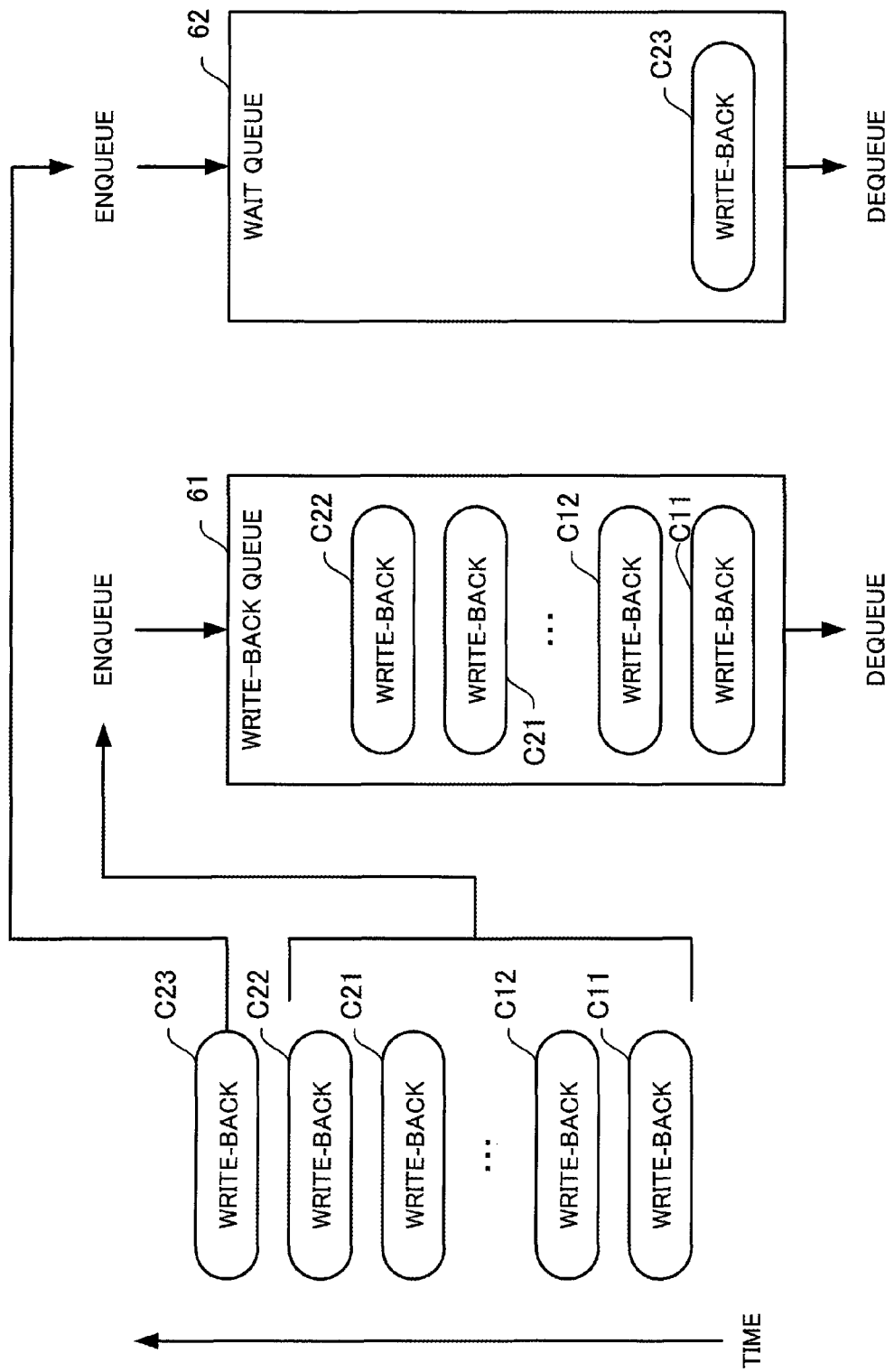
FIG. 5 illustrates an example of write-back scheduling of the second embodiment.

Next, the overview of the write-back scheduling performed by the cache controller 60 of the second embodiment is described using FIG. 5. FIG. 5 illustrates an example of the write-back scheduling of the second embodiment.

Upon receipt of a write command from the host 11, the cache controller 60 writes data onto the cache memory, and performs a completion response with respect to the host 11. The cache controller 60 issues the write-back of dirty data on the cache memory, which are organized in a predetermined unit (e.g., in units of block), to SSDs 31 constituting the RAID group. For example, the cache controller 60 issues a write-back C11, a write-back C12, . . . , a write-back C21, a write-back C22, and a write-back C23 in this order.

The cache controller 60 enqueues the issued write-back into a write-back queue 61, in principle. However, when there is any overloaded SSD 31 among SSDs 31 constituting the RAID group, the cache controller 60 enqueues the issued write-back into a wait queue 62. For example, the cache controller 60 enqueues the write-back C11, write-back C12, . . . , write-back C21, and write-back C22 into the write-back queue 61 in this order. Here, the cache controller 60 enqueues the write-back C23 into the wait queue 62 in accordance with the detection of an overload state of at least one of SSDs 31 constituting the RAID group corresponding to the write-back C23.

The cache controller 60 dequeues from the write-back queue 61 in priority over the wait queue 62. Accordingly, the write-back enqueued into the wait queue 62 will have a lower issuance priority than the write-back enqueued into the write-back queue 61. That is, the cache controller 60 performs suppression control to suppress the issuance of write-back with respect to a RAID group which SSD 31 whose overload state has been detected belongs to.

Note that, as an example of the suppression control performed by the cache controller 60, there is disclosed sorting control to the write-back queue 61 or the wait queue 62. For example, the cache controller 60 may perform suppression control, for example, by attaching a flag to the write-back to be suppressed or by managing the issue time.

Figure 6:
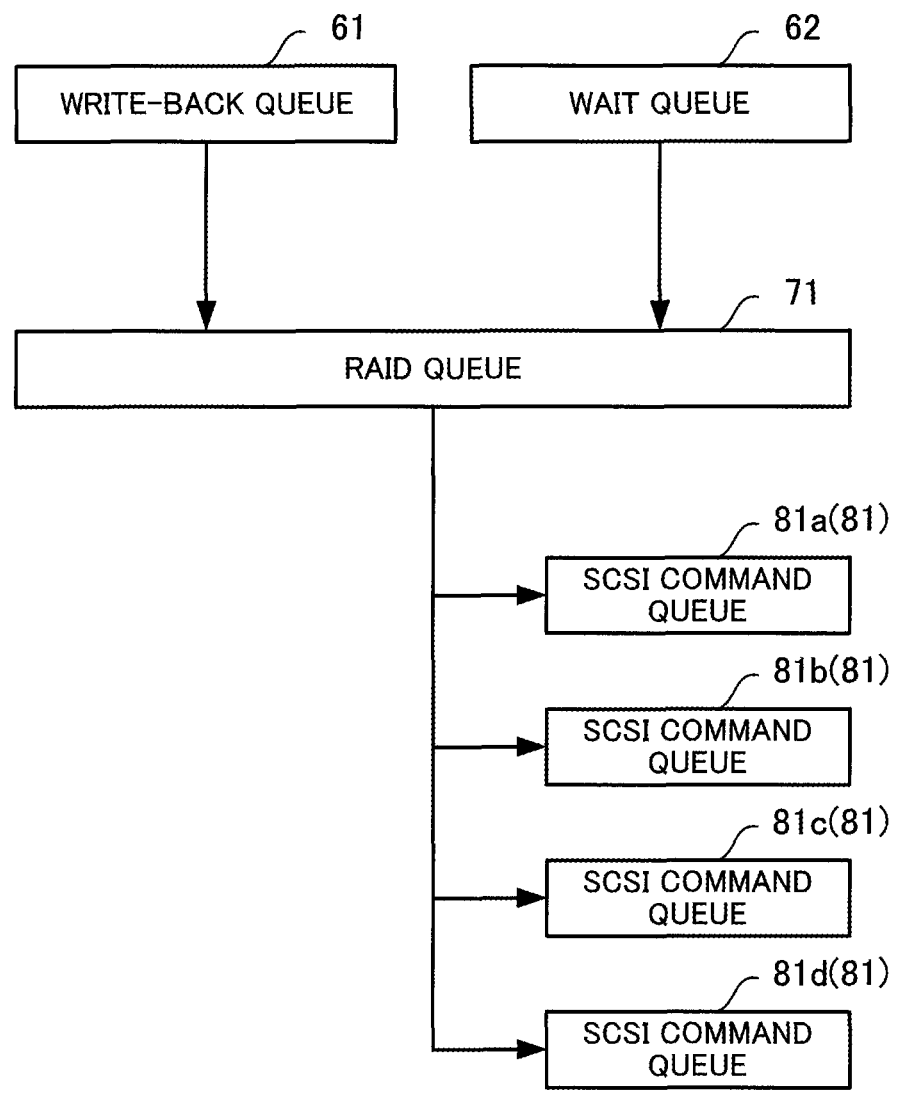
FIG. 6 illustrates an example of a SCSI command issuing process of the second embodiment.

Next, a SCSI (Small Computer System Interface) command issuing process based on a scheduled write-back of the second embodiment is described using FIG. 6. FIG. 6 illustrates an example of the SCSI command issuing process of the second embodiment.

The write-back which the cache controller 60 has dequeued from the write-back queue 61 or wait queue 62 is enqueued into the RAID queue 71 managed by the RAID controller 70. The RAID controller 70 dequeues the write-back from a RAID queue 71, and issues a SCSI command for each of SSDs 31 constituting a RAID group. For example, for the purpose of write-back with respect to Group 50 (FIG. 3), the cache controller 60 issues a SCSI command to SSD 311, SSD 312, SSD 315, and SSD 316 which constitute Group 50.

Upon receipt of a process completion notice from all the SSDs 31 to which the SCSI command has been issued, the RAID controller 70 assumes that the issued write-back is completed. When there is any data in the RAID queue 71, the RAID controller 70 sequentially dequeues write-backs and issues a SCSI command without waiting for completion of the previously issued write-back. The RAID controller 70 determines write-backs in the course from issuance of a SCSI command to reception of the process completion notice to be in execution and manages the number of the write-backs as a concurrent execution number. The RAID controller 70 controls issuance of the write-back from the RAID queue 71 so that the concurrent execution number falls within a range of separately specified concurrent execution number threshold.

The device controller 80 manages a SCSI command queue 81 for each SSD 31. When a SCSI command is issued to SSD 31, the device controller 80 enqueues the SCSI command into a corresponding SCSI command queue 81 (81*a*, 81*b*, 81*c*, 81*d*). SSD 31 sequentially dequeues SCSI commands from the corresponding SCSI command queue 81 and processes the SCSI commands.

In this case, when SSD 31 is overloaded, for example when the garbage collection is in execution in SSD 31, the number of SCSI commands queued in the corresponding SCSI command queue 81 increases. That is, the number of SCSI commands queued in the SCSI command queue 81 may be deemed to represent the load state of SSD 31. Accordingly, when the number of SCSI commands queued in the SCSI command queue 81 exceeds a predetermined threshold, the corresponding SSD 31 may be deemed to be in an overload state.

The overload state of SSD 31 delays the notification of completion of a SCSI command. The delay of the notification of completion of a SCSI command results in a delay of the completion of write-back, thus causing an increase in the concurrent execution number. Once the concurrent execution number exceeds the concurrent execution number threshold, the RAID controller 70 is unable to execute a new write-back. Accordingly, if the disk array device 12 issues a SCSI command to an overloaded SSD 31, the degradation in the performance of the disk array device 12 may be caused. Therefore, the disk array device 12 detects an overloaded SSD 31, and suppresses the write-back with respect to a RAID group which the overloaded SSD 31 belongs to. Thus, the disk array device 12 suppresses the degradation in the performance of the disk array device 12 due to the overload of SSD 31.

Figure 7:
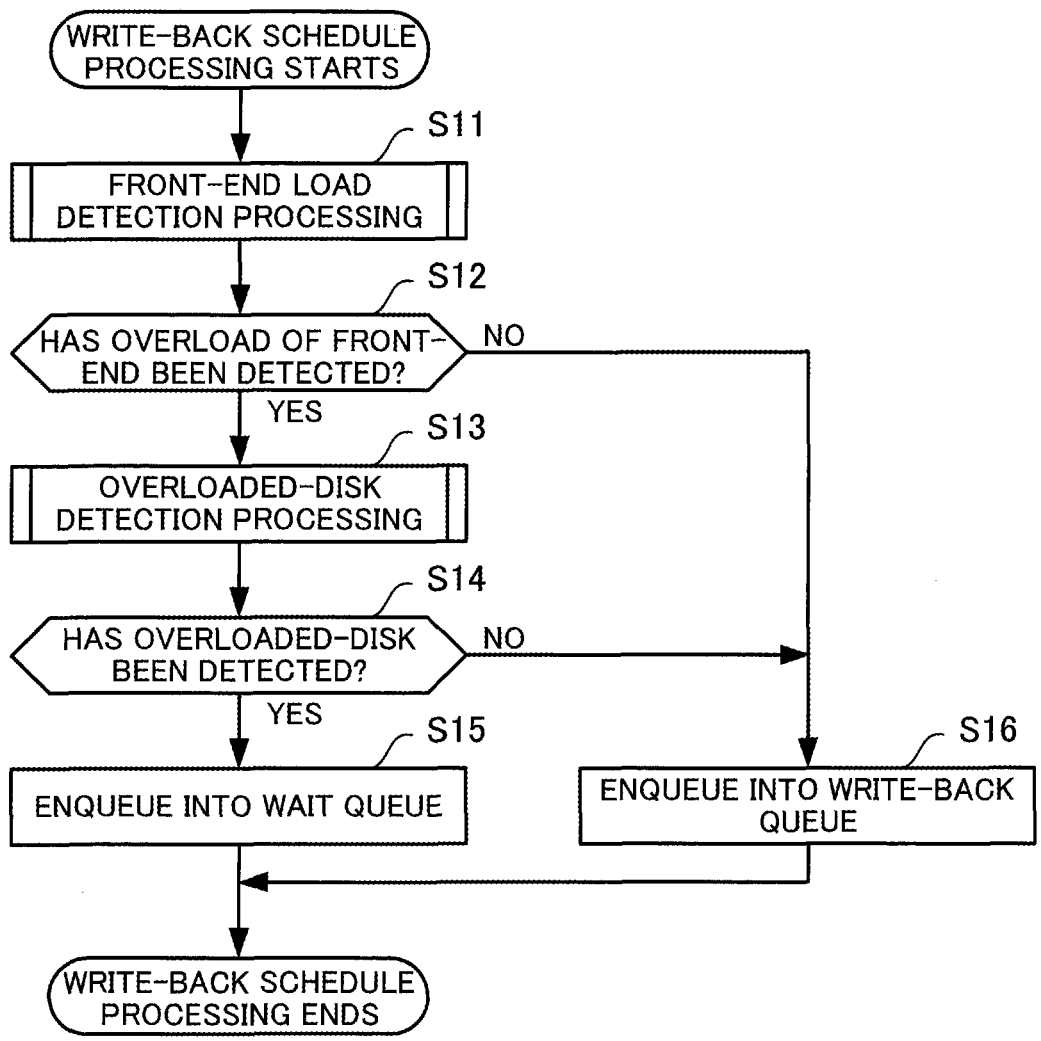
FIG. 7 illustrates the flowchart of a write-back scheduling process of the second embodiment.

Next, write-back schedule processing of the second embodiment is described using FIG. 7. FIG. 7 illustrates the flowchart of write-back schedule processing of the second embodiment.

The write-back schedule processing is for scheduling the write-back. The write-back schedule processing is for enqueuing the write-back, which is issued based on dirty data on a cache memory (write-back cache), into the write-back queue 61 or wait queue 62. That is, the write-back schedule processing is executed by CM 21 (the cache controller 60 and the RAID controller 70) when there is any dirty data that may issue write-back on the cache memory.

[Step S11] The cache controller 60 executes front-end load detection processing. The front-end load detection processing is for detecting an overload of the front end. The detail of the front-end load detection processing is described later using FIG. 8. The cache controller 60 configured to execute the front-end load detection processing functions as a front-end load detector (controller load detector).

[Step S12] The cache controller 60 determines whether or not an overload of the front end has been detected. The cache controller 60 proceeds to Step S13 when an overload of the front end has been detected, while when an overload of the front end has not been detected, it proceeds to Step S16.

[Step S13] The RAID controller 70 executes overloaded-disk detection processing. The overloaded-disk detection processing is for detecting an overload state of SSD 31 constituting a RAID group corresponding to the write-back. The detail of the overloaded-disk detection processing is described later using FIG. 9.

[Step S14] The cache controller 60 determines whether or not an overloaded disk (an overloaded SSD 31) has been detected. The cache controller 60 proceeds to Step S15 when having detected an overloaded disk, and proceeds to Step S16 when having detected no overloaded disk.

[Step S15] The cache controller 60 enqueues the write-back, which is issued based on the dirty data on the cache memory, into the wait queue 62. That is, the issuance of the write-back that is to be enqueued into the wait queue 62 is suppressed as compared with the case where the write-back is enqueued into the write-back queue 61. The cache controller 60 completes the write-back schedule processing after enqueuing the write-back into the wait queue 62.

[Step S16] The cache controller 60 enqueues the write-back, which is issued based on the dirty data on the cache memory, into the write-back queue 61. That is, the issuance of the write-back that is to be enqueued into the write-back queue 61 is given a higher priority over the case where the write-back is enqueued into the wait queue 62. The cache controller 60 completes the write-back schedule processing after enqueuing the write-back into the write-back queue 61.

In this manner, the cache controller 60 enqueues the write-back into the write-back queue 61 without enqueuing it into the wait queue 62, when an overload of the front end has not been detected. This is because in a state where the load of the front end is light, the effect of suppressing the degradation in the performance, the effect being obtained by suppressing the issuance of write-back, is insufficient as compared with the overhead on the suppression of the issuance of write-back. In other words, in a state where the load of the front end is excessive, the disk array device 12 may obtain a sufficient effect of suppressing the degradation in the performance by suppressing the issuance of write-back even if there is an overhead on the suppression of the issuance of write-back. Note that the disk array device 12 may neglect the overhead on the suppression of the issuance of write-back. In that case, the cache controller 60 may enqueue the write-back into the write-back queue 61 or the wait queue 62 in accordance with the detection state of an overloaded disk, regardless of the load state of the front end.

Moreover, because the cache controller 60 enqueues the write-back into the write-back queue 61 or the wait queue 62 in accordance with the detected state of an overloaded disk, the issuance of write-back to the RAID group which an overloaded SSD 31 belongs to may be suppressed. Accordingly, the disk array device 12 may suppress the state where the write-back completion notice of a RAID group which an overloaded SSD 31 belongs to is delayed. Thus, the disk array device 12 may suppress the state where the concurrent execution number of write-back is limited by an overloaded disk. That is, the disk array device 12 may suppress the degradation in the performance of the disk array device 12 due to an overloaded disk.

Figure 8:
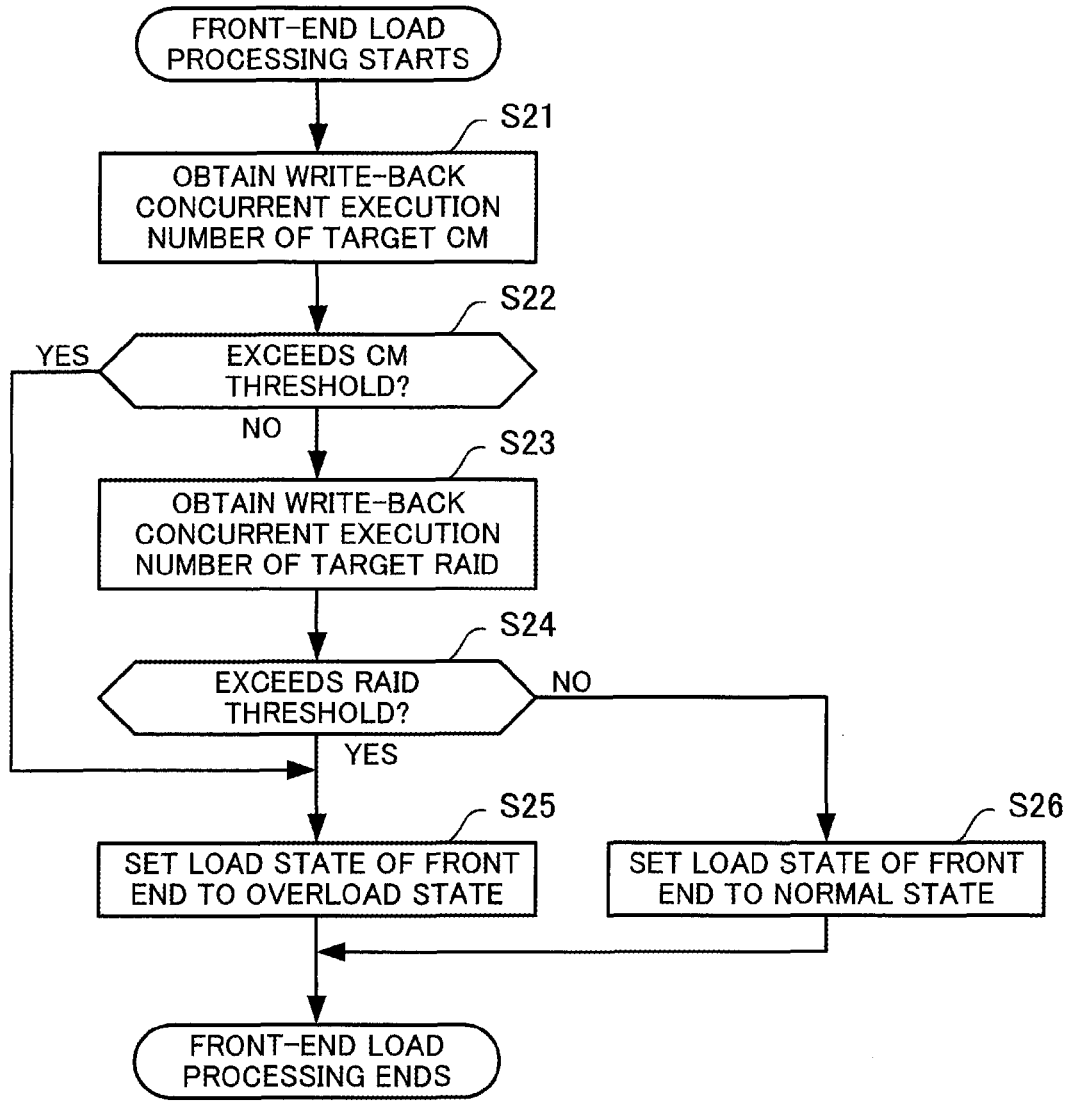
FIG. 8 illustrates the flowchart of a front-end load detection processing of the second embodiment.

Next, the front-end load detection processing of the second embodiment is described using FIG. 8. FIG. 8 illustrates the flowchart of the front-end load detection processing of the second embodiment.

The front-end load detection processing is for detecting an overload of the front end. The front-end load detection processing is executed by the cache controller 60 and the RAID controller 70 in Step S11 of the write-back schedule processing.

[Step S21] The cache controller 60 obtains the concurrent execution number of write-back of a target CM. The target CM is a CM 21 in which the cache controller 60 operates.

[Step S22] The cache controller 60 compares the obtained concurrent execution number of write-back of the target CM with a CM threshold to determine whether or not the concurrent execution number exceeds the CM threshold. The CM threshold is for detecting an overload in units of CM as an overload of the front end. The CM threshold may be set in advance, or may be changed in accordance with the system environment or in accordance with the operation or time. The cache controller 60 proceeds to Step S23 when the concurrent execution number does not exceed the CM threshold. On the other hand, when the concurrent execution number exceeds the CM threshold, the cache controller 60 proceeds to Step S25 by determining that an overload of the front end has been detected.

[Step S23] The RAID controller 70 obtains the concurrent execution number of write-back of the target RAID. The target RAID is a RAID group that is the target of write-back. Because the target RAID may be executed concurrently in a plurality of CMs 21, the concurrent execution number to obtain is the value obtained by summing the concurrent execution numbers of the target RAID in a plurality of CMs 21.

[Step S24] The RAID controller 70 compares the obtained concurrent execution number of write-back of the target RAID with a RAID threshold to determine whether or not the concurrent execution number exceeds the RAID threshold. The RAID threshold is for detecting an overload in units of RAID group as an overload of the front end. The RAID threshold may be set in advance, or may be changed in accordance with the system environment or in accordance with the operation or time. Upon receipt of a determination result of the RAID controller 70, the cache controller 60 proceeds to Step S25 when the concurrent execution number exceeds the RAID threshold, by determining that an overload of the front end has been detected. On the other hand, upon receipt of a determination result of the RAID controller 70, the cache controller 60 proceeds to Step S26 when the concurrent execution number does not exceed the RAID threshold.

[Step S25] The cache controller 60 sets the load state of the front end to an overload state and completes the front-end load detection processing.

[Step S26] The cache controller 60 sets the load state of the front end to the normal state and completes the front-end load detection processing.

Thus, the disk array device 12 may effectively utilize the resource of SSD 31 available inside the RAID group and may achieve an equalization of the load on SSD 31. Accordingly, the disk array device 12 may mitigate a degradation in the throughput performance with respect to a RAID group.

Moreover, the disk array device 12 may mitigate a degradation in the throughput performance with respect to a RAID group when CM 21 of the front end is overloaded. That is, the disk array device 12 may allow the number of concurrently issued write-backs for each CM 21 to have a margin, by suppressing the issuance of write-back to a RAID group having an overloaded SSD 31.

Note that, the disk array device 12 detects the load of the front end both in units of CM and in units of RAID group, but not limited thereto. For example, the disk array device 12 may detect the load of the front end by using the usage status of a cache memory, the reception status of commands from the host 11, the operating status of SSD 31, or the like. Moreover, the disk array device 12 may detect an overload of the front end, based on the threshold determination (AND condition) of two or more parameters, not limited to the threshold determination (OR condition) for each one parameter.

Figure 9:
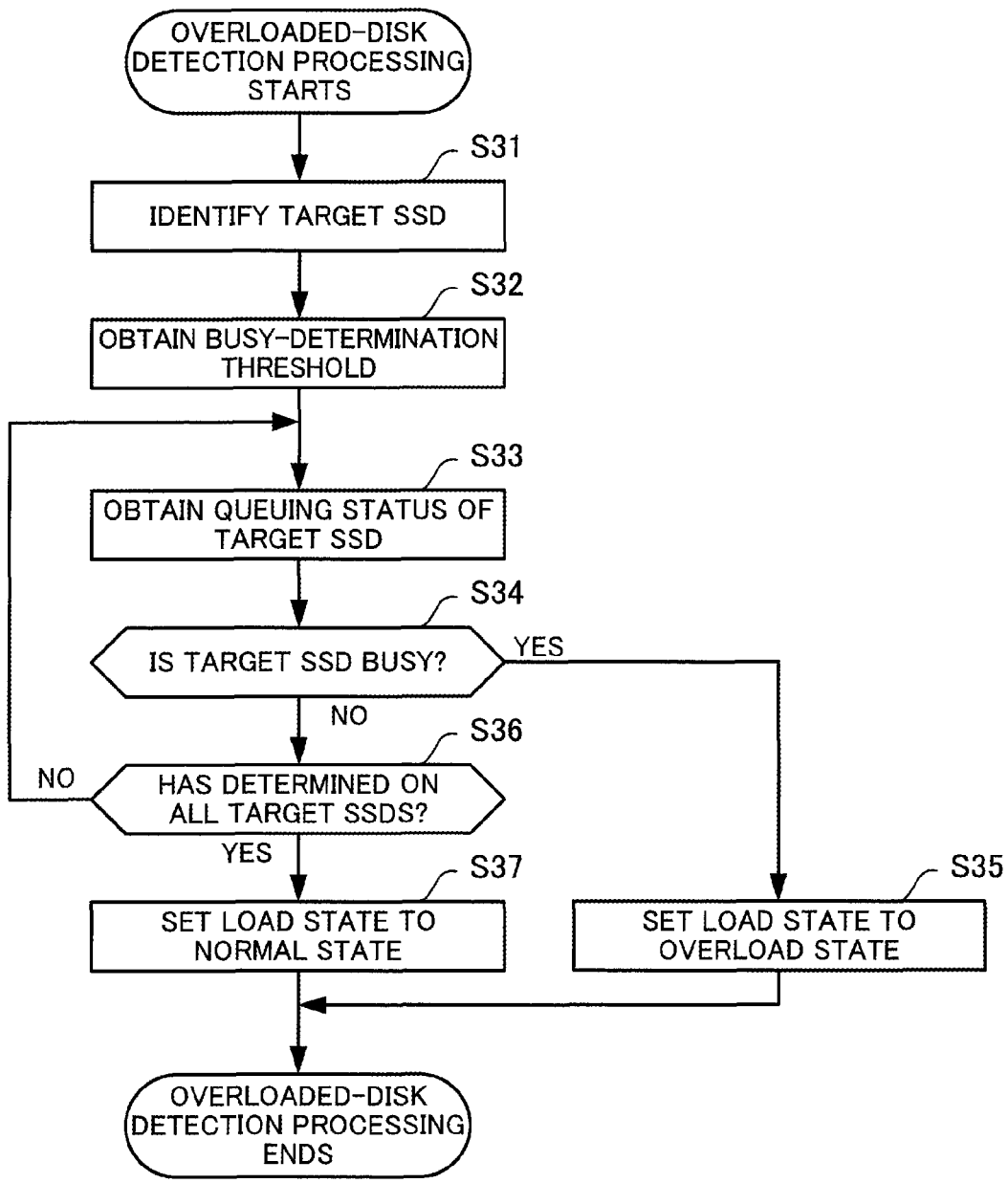
FIG. 9 illustrates the flowchart of overloaded-disk detection processing of the second embodiment.

Next, the overloaded-disk detection processing of the second embodiment is described using FIG. 9. FIG. 9 illustrates the flowchart of the overloaded-disk detection processing of the second embodiment.

The overloaded-disk detection processing is for detecting an overload state of SSD 31 constituting a RAID group corresponding to the write-back. The overloaded-disk detection processing is executed by the RAID controller 70 in Step S13 of the write-back schedule processing.

[Step S31] The RAID controller 70 identifies, as a target SSD, an SSD 31 constituting a RAID group corresponding to the write-back.

[Step S32] The RAID controller 70 obtains a busy determination threshold. The busy determination threshold is used for determining whether or not the target SSD is busy.

[Step S33] The RAID controller 70 obtains the queuing status of the target SSD, i.e., the number of SCSI commands queued in the SCSI command queue 81.

[Step S34] The RAID controller 70 compares the number of SCSI commands queued in the SCSI command queue of the target SSD with the busy determination threshold, and determines that the target SSD is busy, when the number of SCSI commands exceeds the busy determination threshold. The cache controller 60 proceeds to Step S36 when the target SSD is not busy. On the other hand, the RAID controller 70 proceeds to Step S35 when the target SSD is busy, i.e., when an overload state is detected in one of target SSDs.

[Step S35] The RAID controller 70 sets, to an overload state, the load state of SSD constituting a RAID group corresponding to the write-back and completes the overloaded-disk detection processing.

[Step S36] The RAID controller 70 determines whether or not the busy determination has been performed on all the target SSDs. The RAID controller 70 proceeds to Step S33 when the busy determination has not been performed yet on all the target SSDs, and obtains a queuing status of another SSD 31 constituting the RAID group. On the other hand, the RAID controller 70 proceeds to Step S37 when the busy determination has been performed on all the target SSDs, i.e., when an overload state is not detected for all the target SSDs.

[Step S37] The RAID controller 70 sets, to the normal state, the load state of SSD constituting a RAID group corresponding to the write-back and completes the overloaded-disk detection processing.

In this manner, the disk array device 12 may detect an overload state of SSD 31 constituting a RAID group corresponding to the write-back.

Figure 10:
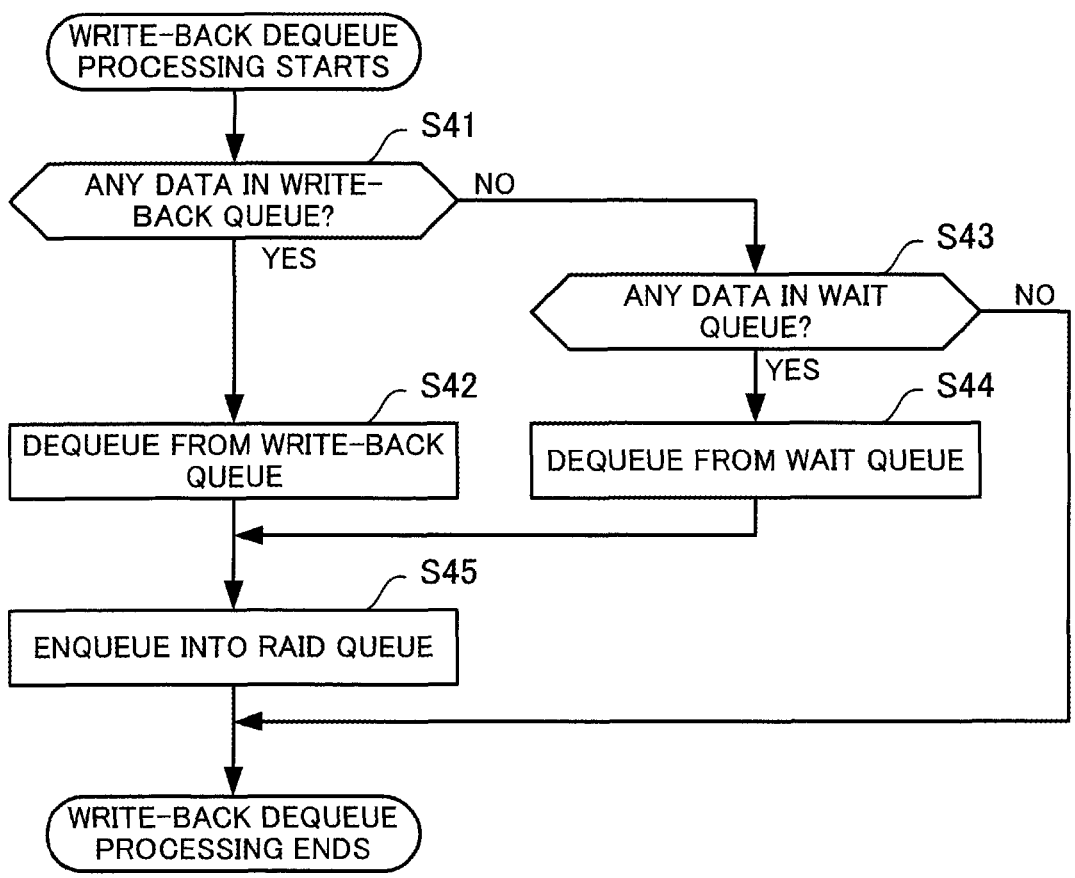
FIG. 10 illustrates the flowchart of write-back dequeue processing of the second embodiment.

Next, write-back dequeue processing of the second embodiment is described using FIG. 10. FIG. 10 illustrates the flowchart of the write-back dequeue processing of the second embodiment.

The write-back dequeue processing is for dequeuing write-back into the write-back queue 61 or the wait queue 62 and enqueuing the write-back into the RAID queue 71. The write-back dequeue processing is executed by the RAID controller 70.

[Step S41] The RAID controller 70 determines whether or not there is any data (write-back) in the write-back queue 61. The RAID controller 70 proceeds to Step S42 when there is any data in the write-back queue 61, and proceeds to Step S43 when there is no data in the write-back queue 61.

[Step S42] The RAID controller 70 dequeues data from the write-back queue 61. Accordingly, when there is data in the write-back queue 61, the RAID controller 70 dequeues the data in priority over the wait queue 62.

[Step S43] The RAID controller 70 determines whether or not there is any data (write-back) in the wait queue 62. The RAID controller 70 proceeds to Step S44 when there is data in the wait queue 62, and completes the write-back dequeue processing when there is no data in the wait queue 62.

[Step S44] The RAID controller 70 dequeues the data from the wait queue 62.

[Step S45] The RAID controller 70 enqueues the data, which is dequeued from the write-back queue 61 or the wait queue 62, into the RAID queue 71 and completes the write-back dequeue processing.

Figure 11:
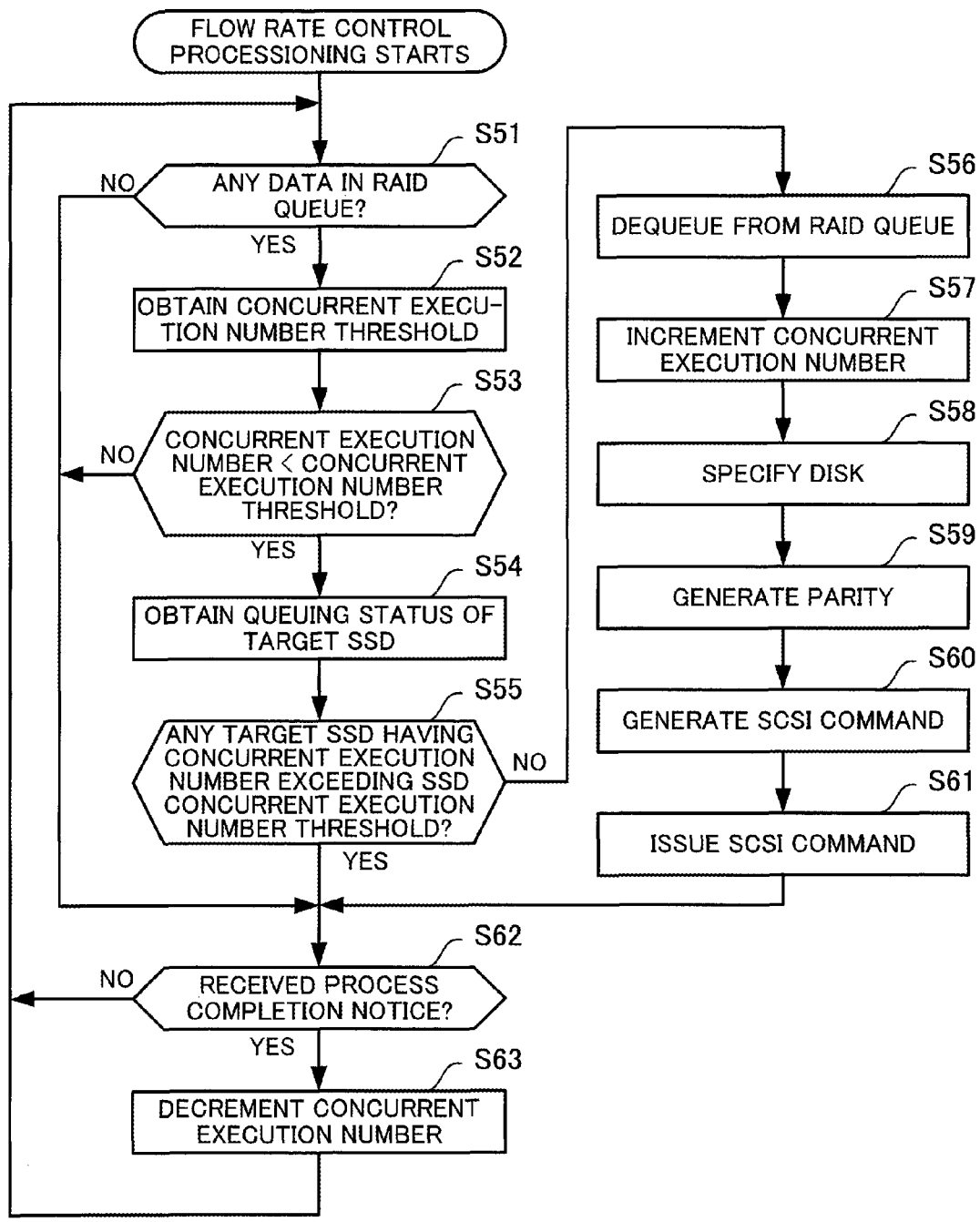
FIG. 11 illustrates the flowchart of flow rate control processing of the second embodiment.

Next, flow rate control processing of the second embodiment is described using FIG. 11. FIG. 11 illustrates the flowchart of the flow rate control processing of the second embodiment.

The flow rate control processing is for controlling the concurrent execution number (flow rate) of write-back. The flow rate control processing is executed by the RAID controller 70.

[Step S51] The RAID controller 70 determines whether or not there is any data (write-back) in the RAID queue 71. The RAID controller 70 proceeds to Step S52 when there is data in the RAID queue 71, and proceeds to Step S62 when there is no data in the RAID queue 71.

[Step S52] The RAID controller 70 obtains a concurrent execution number threshold. The concurrent execution number threshold is used for controlling the concurrent execution number of write-back.

[Step S53] The RAID controller 70 compares the concurrent execution number of write-back with the concurrent execution number threshold, and proceeds to Step S54 when the concurrent execution number is smaller than the concurrent execution number threshold, and proceeds to Step S62 when the concurrent execution number is not smaller than the concurrent execution number threshold.

[Step S54] The RAID controller 70 obtains the queuing status of a target SSD, i.e., the number of SCSI commands queued in the SCSI command queue 81.

[Step S55] The RAID controller 70 compares the number of SCSI commands queued in the SCSI command queue of a target SSD with the SSD concurrent execution number threshold. The RAID controller 70 proceeds to Step S62 when there is a target SSD in which the number of SCSI commands exceeds the SSD concurrent execution number threshold, and proceeds to Step S56 when there is no target SSD in which the number of SCSI commands exceeds the SSD concurrent execution number threshold. Note that the SSD concurrent execution number threshold is for suppressing the concurrent execution number of write-back in accordance with the queuing status of a target SSD. The SSD concurrent execution number threshold may be set in advance, or may be changed in accordance with the system environment or in accordance with the operation or time.

[Step S56] The RAID controller 70 dequeues the data (write-back) from the RAID queue 71.

[Step S57] The RAID controller 70 increments the concurrent execution number of write-back.

[Step S58] The RAID controller 70 specifies a disk (SSD 31) constituting a RAID group corresponding to the write-back.

[Step S59] The RAID controller 70 generates parity data of the write data corresponding to the write-back.

[Step S60] The RAID controller 70 generates a SCSI command of the write data corresponding to the write-back.

[Step S61] The RAID controller 70 issues a SCSI command for instructing to write the write-data or parity data to each of the disks constituting the RAID group. The issued SCSI command is queued into the corresponding SCSI command queue 81 by the device controller 80.

[Step S62] The RAID controller 70 determines whether or not a process completion notice of write-back has been received. The RAID controller 70 proceeds to Step S63 when the process completion notice of write-back has been received, and proceeds to Step S51 when the process completion notice of write-back has not been received.

[Step S63] The RAID controller 70 decrements the concurrent execution number of write-back, and proceeds to Step S51.

In this manner, the RAID controller 70 increments the concurrent execution number by issuing write-back and decrements the concurrent execution number upon receipt of the process completion notice of the write-back, thereby managing the concurrent execution number of write-back.

Moreover, the RAID controller 70 may generate a status, where data (SCSI command) easily accumulates in the SCSI command queue 81, by suppressing the concurrent execution number of write-back in accordance with the queuing status of the target SSD. For the purpose of suppressing the concurrent execution number of write-back in accordance with the queuing status of a target SSD, the SSD concurrent execution number threshold may be set smaller than the concurrent execution number threshold. The disk array device 12 may detect an early overload (e.g., a processing delay due to the execution of garbage collection) of the target SSD by causing data to easily accumulate in the SCSI command queue 81. Thus, the disk array device 12 may suppress the degradation in the performance of the disk array device 12 due to an overloaded disk.

Third Embodiment

Next, a third embodiment for updating the concurrent execution number threshold is described. The disk array device 12 of the third embodiment updates the concurrent execution number threshold based on the statistical information for each RAID.

Figure 12:
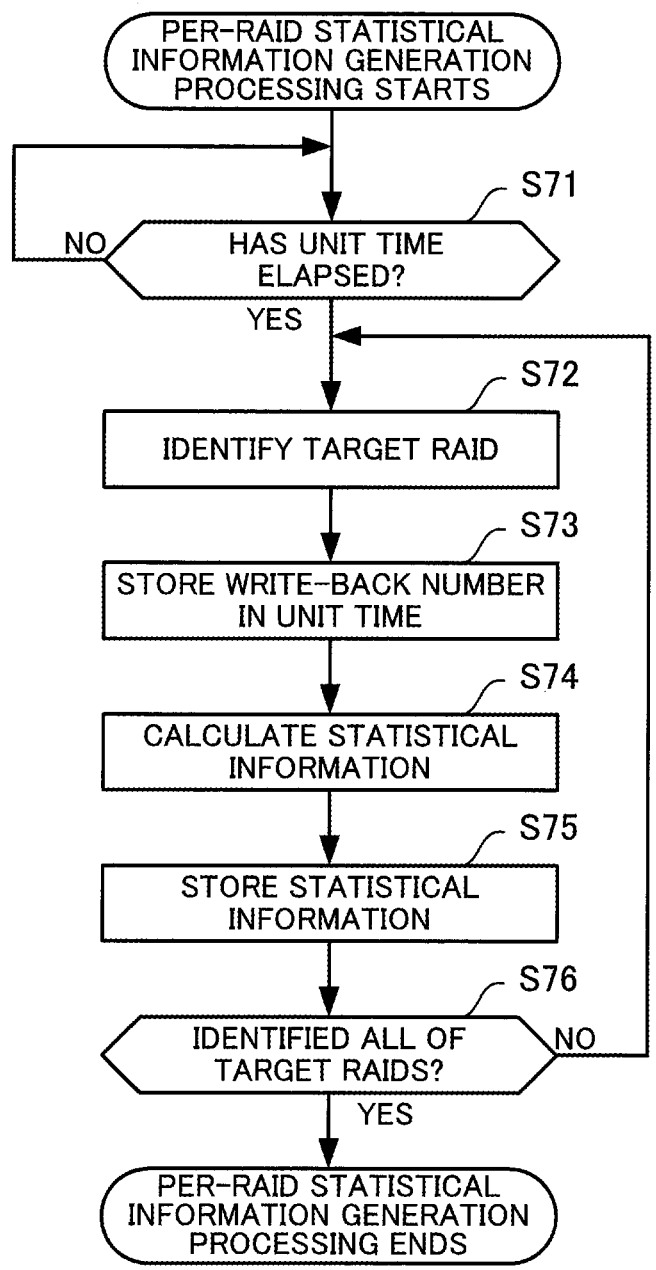
FIG. 12 illustrates the flowchart of per-RAID statistical information generation processing of a third embodiment.

First, per-RAID statistical information generation processing of the third embodiment is described using FIG. 12 and FIG. 13. FIG. 12 illustrates the flowchart of the per-RAID statistical information generation processing of the third embodiment. The per-RAID statistical information generation processing is for generating the statistical information for each RAID. The per-RAID statistical information generation processing is a process executed by CM 21. CM 21 functions as a statistical information generation unit configured to generate statistical information.

[Step S71] CM 21 determines elapse of a unit time. CM 21 proceeds to Step S72 when a unit time has elapsed, and waits for the unit time to elapse when the unit time has not elapsed yet. The unit time is a time (e.g., 10 minutes) serving as the unit of collection of statistical information, and an arbitrary time is set in advance as the unit time.

[Step S72] CM 21 identifies a RAID group (target RAID) which is the generation target of statistical information.

Here, a per-RAID statistical information table is described using FIG. 13. FIG. 13 illustrates an example of the per-RAID statistical information table of the third embodiment.

The statistical information table is prepared for each RAID group which is the generation target of statistical information. A per-RAID statistical information table 200 is one of the statistical information tables prepared for each RAID group. The per-RAID statistical information table 200 stores the statistical information for each unit time of RAID group "#1". Note that "#1" is identification information with which a RAID group is uniquely identifiable.

The per-RAID statistical information table 200 stores a write-back number, a time integrated value, and an average value as the statistical information for each unit time. The write-back number is the number of write-backs that are issued to a target RAID in the unit time. The time integrated value is the integrated value (total value) of the write-back numbers in a range from the unit time to a predetermined time. The predetermined time is the time obtained by multiplying the unit time by an integrated number (the number of unit times used for integration), and is, for example, 10 times the unit time. The average value is the value obtained by dividing the time integrated value by the integrated number.

For example, in a unit time "tn1", the write-back number is "nn1", the time integrated value is "sn1", and the average value is "an1". The time integrated value "sn1" is the integrated value of the write-back numbers for the last 10 unit times, including the write-back number "nn1" in the unit time "tn1". The average value "an1" is the average value of the write-back numbers for the last 10 unit times, including the write-back number "nn1" in the unit time "tn1".

Note that the statistical information is not limited thereto. The statistical information for each preset time zone may be collected. The time zone during which the load on the disk array apparatus 12 becomes high may differ depending on the applications, e.g., the load is high in the daytime and decreases at nighttime. Therefore, collection and collection method of the items to grasp the contents and/or characteristics of the load on the disk array apparatus 12 may be employed. For example, the disk array device 12 may divide one day into three time zones (such as from 0:00 to 8:00, from 8:00 to 16:00, and from 16:00 to 24:00) and obtain the statistical information for each time zone. Moreover, the unit of acquisition of statistical information is not limited to the time zone of one day, but may be a divided zone, such as a day of a week, a month, or a season.

Again, the description returns to the description of the per-RAID statistical information generation processing.

[Step S73] CM 21 stores the write-back number for each unit time onto the statistical information table of a target RAID. For example, CM 21 stores, in the unit time "tn1", the write-back number "nn1" of the RAID group "#1" onto the per-RAID statistical information table 200.

[Step S74] CM 21 calculates the statistical information of the target RAID. For example, CM 21 calculates, in the unit time "tn1", the time integrated value "sn1" and the average value "an1" at the time of the unit time "tn1", as the statistical information of RAID group "#1".

[Step S75] CM 21 stores the statistical information onto the statistical information table of a target RAID. For example, CM 21 stores the time integrated value "sn1" and the average value "an1", as the statistical information of the RAID group "#1" in the unit time "tn1".

[Step S76] CM 21 determines whether or not all of the target RAIDs have been identified. CM 21 proceeds to Step S72 when all of the target RAIDs have not been identified. On the other hand, CM 21 completes the per-RAID statistical information generation processing when all of the target RAIDs have been identified, i.e., when the statistical information table of all the RAID groups which are the generation target of the statistical information has been updated (when the statistical information has been generated and stored).

Figure 14:
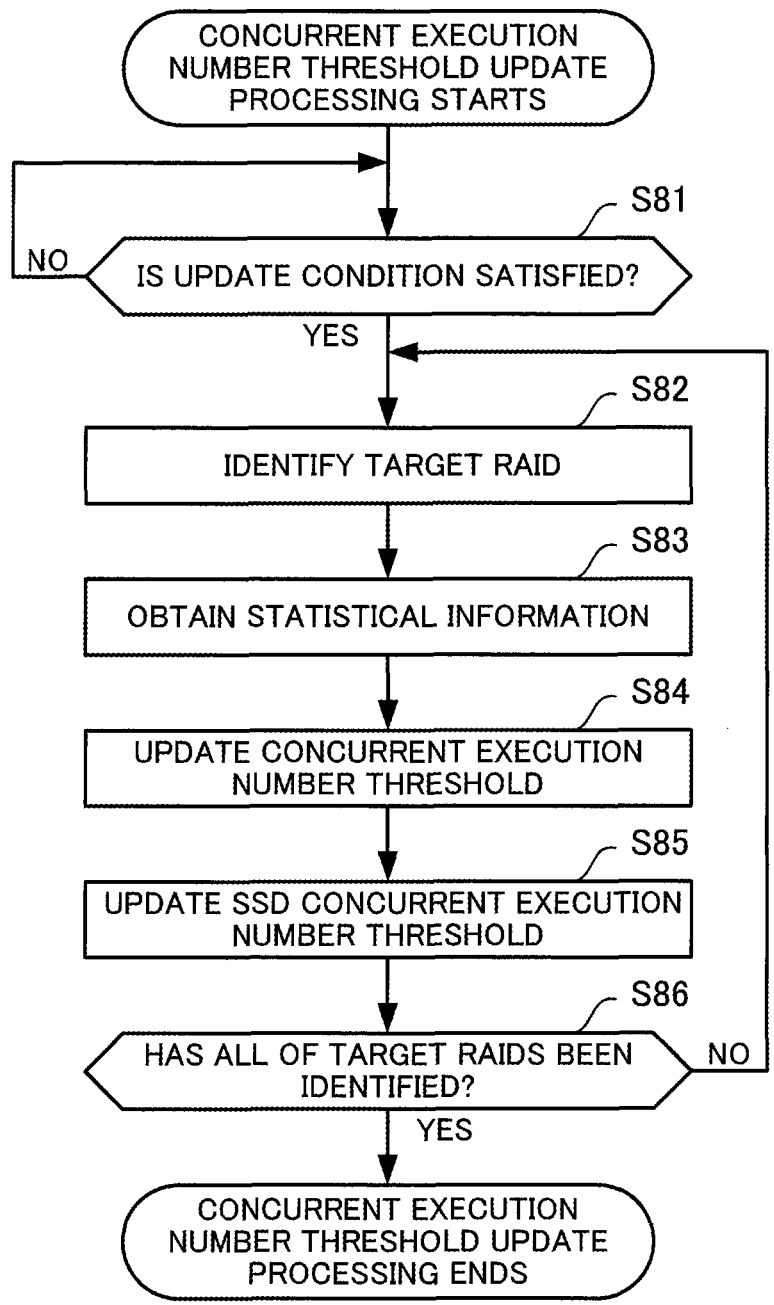
FIG. 14 illustrates the flowchart of concurrent execution number threshold update processing of the third embodiment.

Next, concurrent execution number threshold update processing of the third embodiment is described using FIG. 14. FIG. 14 illustrates the flowchart of the concurrent execution number threshold update processing of the third embodiment.

The concurrent execution number threshold update processing is for updating the concurrent execution number threshold and the SSD concurrent execution number threshold based on the statistical information generated by the per-RAID statistical information generation processing. The concurrent execution number threshold update processing is executed by CM 21. CM 21 functions as a threshold updating unit configured to update the concurrent execution number threshold and the SSD concurrent execution number threshold.

[Step S81] CM 21 determines whether or not the update condition of the concurrent execution number threshold and the SSD concurrent execution number threshold is satisfied. CM 21 proceeds to Step S82 when the update condition of the concurrent execution number threshold and the SSD concurrent execution number threshold is satisfied, and waits for the update condition to be satisfied when the update condition is not satisfied. For the update condition, any condition may be set. For example, the update condition may be a predetermined time, the elapse of a predetermined time, a variation of the statistical information, or the like.

[Step S82] CM 21 identifies a RAID group (target RAID) which is the update target of the concurrent execution number threshold and the SSD concurrent execution number threshold.

[Step S83] CM 21 obtains the statistical information from the statistical information table of the target RAID.

[Step S84] With reference to the statistical information threshold correspondence table, CM 21 obtains the concurrent execution number threshold from the statistical information table of the target RAID and updates the concurrent execution number threshold with the obtained concurrent execution number threshold. Here, the statistical information threshold correspondence table is described using FIG. 15. FIG. 15 illustrates an example of the statistical information threshold correspondence table of the third embodiment.

A statistical information threshold correspondence table 210 is for defining the concurrent execution number threshold and SSD concurrent execution number threshold corresponding to the statistical information of the target RAID.

With the time integrated value and average value as indexes for the statistical information, the statistical information threshold correspondence table 210 defines a concurrent execution number threshold and SSD concurrent execution number threshold that are determined to be appropriate based on the statistical information. For example, when the time integrated value is equal to or less than "VS1" or the average value is equal to or less than "VA1", the statistical information threshold correspondence table 210 indicates that the concurrent execution number threshold is "ET1" and the SSD concurrent execution number threshold is "SET11". Accordingly, CM 21 may update, based on the statistical information, the concurrent execution number threshold and the SSD concurrent execution number threshold to values determined to be appropriate, respectively.

Note that, the statistical information threshold correspondence table 210 may be common or may be different for each RAID group. With the use of the statistical information threshold correspondence table 210 different for each RAID group, the disk array device 12 may use the concurrent execution number threshold and SSD concurrent execution number threshold in accordance with the configuration of SSD 31 of the RAID group or in accordance with the use environment. Thus, the disk array device 12 may more suitably suppress a degradation in the performance of the disk array device 12 caused by an overloaded SSD 31.

Again, the description returns to the description of the per-RAID statistical information generation processing.

[Step S85] With reference to the statistical information threshold correspondence table 210, CM 21 obtains the concurrent execution number threshold from the statistical information table of the target RAID, and updates the SSD concurrent execution number threshold with the obtained SSD concurrent execution number threshold.

[Step S86] CM 21 determines whether or not all of the target RAIDs have been identified. CM 21 proceeds to Step S82 when all of the target RAIDs have not been identified. On the other hand, CM 21 completes the concurrent execution number threshold update processing when all of the target RAIDs have been identified, i.e., when with the concurrent execution number threshold, the concurrent execution number threshold and SSD concurrent execution number threshold have been updated for all the RAID groups which are the update targets of the concurrent execution number threshold.

Note that, CM 21 is configured to update the concurrent execution number threshold and the SSD concurrent execution number threshold for the RAID group, but CM 21 may be configured to update either one of them.

Fourth Embodiment

Next, a fourth embodiment is described for updating the concurrent execution number threshold and the SSD concurrent execution number threshold. The disk array device 12 of the fourth embodiment updates the concurrent execution number threshold based on the statistical information for each CM.

Figure 16:
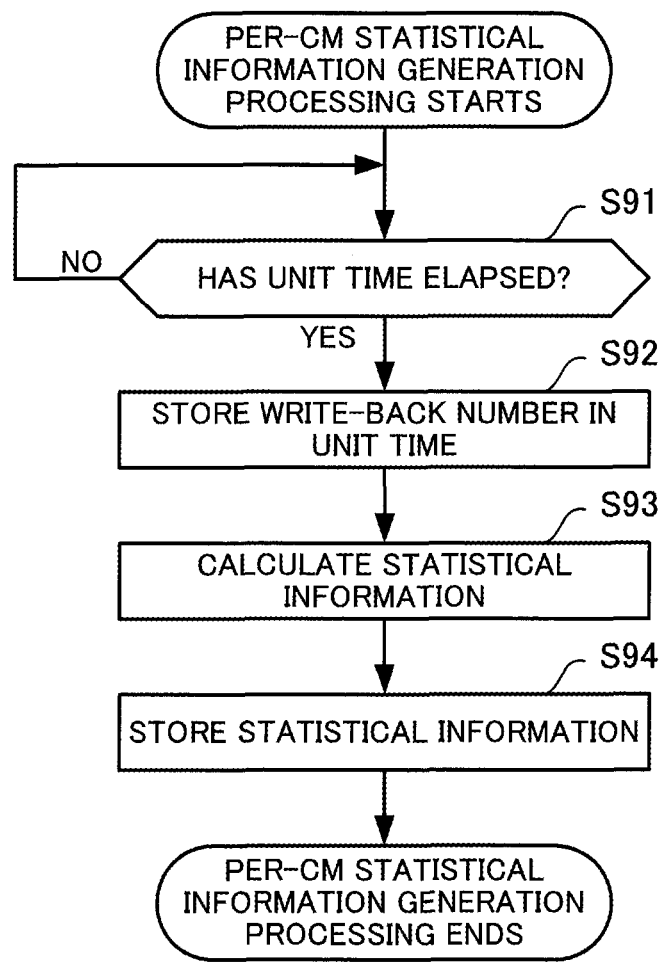
FIG. 16 illustrates the flowchart of per-CM statistical information generation processing of a fourth embodiment.

First, per-CM statistical information generation processing of the fourth embodiment is described using FIG. 16 and FIG. 17. FIG. 16 illustrates the flowchart of the per-CM statistical information generation processing of the fourth embodiment. The per-CM statistical information generation processing is for generating the statistical information for each CM. The per-CM statistical information generation processing is the processing executed by CM 21. CM 21 functions as a statistical information generation unit configured to generate statistical information.

[Step S91] CM 21 determines elapse of the unit time. CM 21 proceeds to Step S92 when the unit time has elapsed, and waits for the unit time to elapse when the unit time has not elapsed. The unit time is a time (e.g., minutes) serving as the unit of collection of statistical information, and an arbitrary time is set in advance as the unit time.

Here, a per-CM statistical information table is described using FIG. 17. FIG. 17 illustrates an example of the per-CM statistical information table of the fourth embodiment.

The statistical information table is prepared for each CM which is the generation target of the statistical information. A per-CM statistical information table 230 is one of the statistical information tables prepared for each CM. The per-CM statistical information table 230 stores the statistical information for each unit time of CM "#1". Note that "#1" is identification information with which a CM is uniquely identifiable.

The per-CM statistical information table 230 stores a write-back number, a time integrated value, and an average value as the statistical information for each unit time. The write-back number is the number of write-backs issued to a target RAID in the unit time. The time integrated value is the integrated value (total value) of the write-back numbers in a range from the unit time to a predetermined time. The predetermined time is the time obtained by multiplying the unit time by an integrated number (the number of unit times used for integration), and is, for example, 10 times the unit time. The average value is the value obtained by dividing the time integrated value by the integrated number.

For example, in the unit time "tn1", the write-back number is "nn1", the time integrated value is "sn1", and the average value is "an1". The time integrated value "sn1" is the integrated value of the write-back numbers for the last 10 unit times, including the write-back number "nn1" in the unit time "tn1". The average value "an1" is the average value of the write-back numbers for the last 10 unit times, including the write-back number "nn1" in the unit time "tn1".

Note that, the statistical information is not limited thereto. The statistical information for each preset time zone may be collected. The time zone during which the load on the disk array device 12 becomes high may differ depending on the applications, e.g., the load is high in the daytime and decreases at nighttime. Therefore, collection and collection method of the items to grasp the contents and/or characteristics of the load on the disk array apparatus 12 may be employed. For example, the disk array device 12 may divide one day into three time zones (such as, from 0:00 to 8:00, from 8:00 to 16:00, and from 16:00 to 24:00) and obtain the statistical information for each time zone. Moreover, the unit of acquisition of statistical information is not limited to the time zone of one day, but may be a divided zone, such as a day of a week, a month, or a season.

Again, the description returns to the description of the per-CM statistical information generation processing.

[Step S92] CM 21 stores the write-back number for each unit time onto the statistical information table of the target CM. For example, CM 21 stores the write-back number "nn1" of CM "#1" onto the per-CM statistical information table 230 in the unit time "tn1".

[Step S93] CM 21 calculates the statistical information of the target CM. For example, CM 21 calculates, in the unit time "tn1", the time integrated value "sn1" and the average value "an1" at the time of the unit time "tn1", as the statistical information of CM "#1".

[Step S94] CM 21 stores statistical information onto the statistical information table of the target CM. For example, CM 21 stores the time integrated value "sn1" and the average value "an1" as the statistical information of CM "#1" in the unit time "tn1" and completes the per-CM statistical information generation processing.

Figure 18:
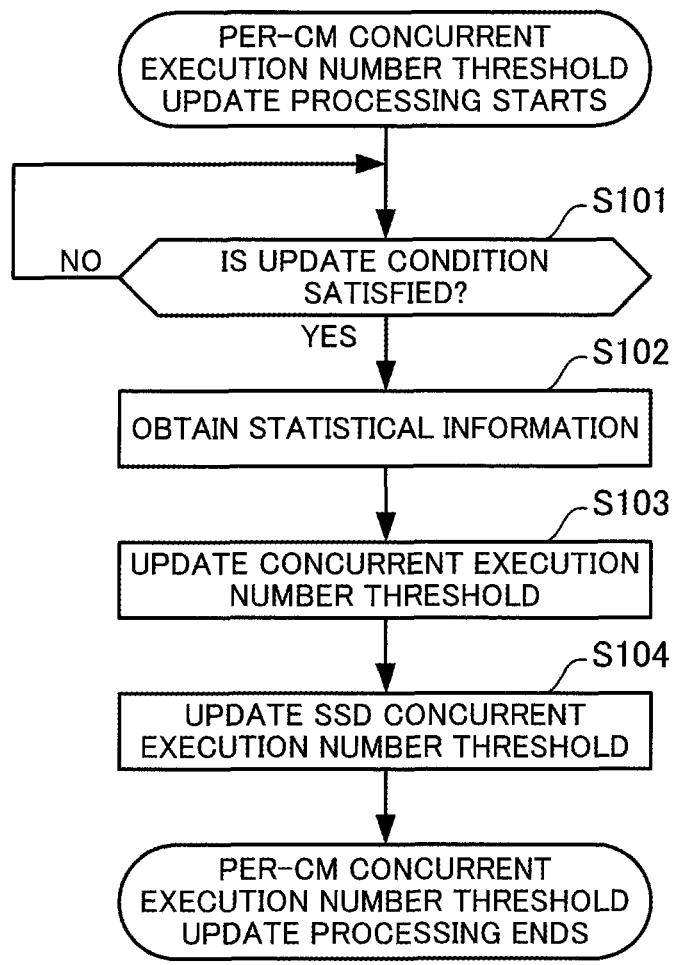
FIG. 18 illustrates the flowchart of per-CM concurrent execution number threshold update processing of the fourth embodiment.

Next, per-CM concurrent execution number threshold update processing of the fourth embodiment is described using FIG. 18. FIG. 18 illustrates the flowchart of the per-CM concurrent execution number threshold update processing of the fourth embodiment.

The per-CM concurrent execution number threshold update processing is for updating the concurrent execution number threshold and the SSD concurrent execution number threshold based on the statistical information generated by the per-CM statistical information generation processing. The per-CM concurrent execution number threshold update processing is executed by CM 21. CM 21 functions as a threshold updating unit configured to update the concurrent execution number threshold and the SSD concurrent execution number threshold.

[Step S101] CM 21 determines whether or not the update condition of the concurrent execution number threshold and the SSD concurrent execution number threshold is satisfied. CM 21 proceeds to Step S102 when the update condition of the concurrent execution number threshold and the SSD concurrent execution number threshold is satisfied, and waits for the update condition to be satisfied when the update condition is not satisfied. For the update condition, any condition may be set. For example, the update condition may be a predetermined time, the elapse of a predetermined time, a variation of the statistical information, or the like.

[Step S102] CM 21 obtains the statistical information from the statistical information table of the target CM.

[Step S103] With reference to the statistical information threshold correspondence table, CM 21 obtains the concurrent execution number threshold from the statistical information table of the target CM and updates the concurrent execution number threshold with the obtained concurrent execution number threshold. Note that, the statistical information threshold correspondence table of the fourth embodiment is the same as the statistical information threshold correspondence table 210 of the third embodiment that has been described using FIG. 15.

[Step S104] With reference to the statistical information threshold correspondence table, CM 21 obtains an SSD concurrent execution number threshold from the statistical information table of the target CM. CM 21 updates the SSD concurrent execution number threshold with the obtained SSD concurrent execution number threshold and completes the per-CM concurrent execution number threshold update processing.

Note that, CM 21 is configured to update the concurrent execution number threshold and the SSD concurrent execution number threshold of a RAID group, but CM 21 may be configured to update either one of them.

Note that, the above-described processing functions may be implemented on a computer. In that case, the above-described functions, which the storage control apparatus 1 and the disk array device 12 (CM 21) are supposed to have, are encoded and provided in the form of computer programs. A computer system executes those programs, thereby providing the above-described processing functions. The programs may be stored in a computer-readable medium. Such computer-readable media include magnetic storage devices, optical discs, magneto-optical storage media, semiconductor memory devices, and other non-transitory storage media. The examples of the magnetic storage include a hard disk drive unit (HDD), a flexible disk (FD), and a magnetic tape. The examples of the optical disc include a DVD, a DVD-RAM, a CD-ROM/RW, and the like. The examples of the magneto-optical recording medium include an MO (Magneto-Optical disk).

For the purpose of distributing computer programs, portable storage medium, such as DVD and CD-ROM, having the programs recorded thereon is made available for sale. It is also possible to store the computer programs in a storage device of a server computer and transfer the programs to other computers from the server computer through the network.

A computer executing a program installs programs recorded on a portable storage medium or transferred from a server computer in a storage device of the computer. The computer then reads the programs from the storage device of the computer and executes processing in accordance with the programs. Where appropriate, the computer may directly read the programs from the portable storage medium and execute processing in accordance with the programs. The computer may also execute processing in accordance with received programs each time the programs are transferred from the server computer connected through the network.

Moreover, at least a part of the above-described processing functions may be implemented on an electronic circuit, such as a DSP, an ASIC, or a PLD.

According to an aspect of the embodiments disclosed herein, in a storage control apparatus, a storage control program, and a storage control method, a degradation in the performance of a storage device due to an overload of a solid state drive may be suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage control apparatus which controls write-back of data stored in a write-back cache with respect to a group including a plurality of solid state drives, the storage control apparatus comprising one or more processors configured to perform a procedure including:
    detecting a number of unexecuted commands in each of the plurality of solid state drives;
    suppressing issuance of requests to process the write-back with respect to one or more solid state drives in the group including a solid state drive whose number of unexecuted commands exceeds a first threshold;
    detecting a number of concurrently issued requests to process the write-back for the group;
    suppressing issuance of requests to process the write-back when the detected number of concurrently issued requests to process the write-back for the group exceeds a second threshold;
    generating, for the group, statistical information related to issuance of requests to process the write-back; and
    updating one of the first threshold and second threshold, based on the statistical information generated for the group.

2. The storage control apparatus according to claim 1, wherein the group is a RAID group.

3. The storage control apparatus according to claim 1, wherein, the procedure further includes detecting a processing delay in processing a command that is issued for each solid state drive based on issued requests to process the write-back.

4. The storage control apparatus according to claim 1, wherein the first threshold is smaller than the second threshold.

5. The storage control apparatus according to claim 1, further comprising two or more sharing controllers configured to share the issuance of the requests to process the write-back,
wherein the procedure further includes suppressing issuance of requests to process the write-back when a number of concurrently issued requests to process the write-back for each of the sharing controllers exceeds a third threshold.

6. The storage control apparatus according to claim 5, wherein, the procedure further includes detecting a processing delay in processing a command that is issued for each solid state drive based on issued requests to process the write-back.

7. The storage control apparatus according to claim 1, wherein the statistical information is a number of requests that are issued during each unit time to process the write-back.

8. The storage control apparatus according to claim 1, wherein the statistical information is a number of requests that are issued during each different time zone in a day to process the write-back.

9. A non-transitory computer-readable storage medium storing a storage control program of a storage control apparatus which controls write-back of data stored in a write-back cache with respect to a group including a plurality of solid state drives, the storage control program causing a computer to execute a procedure comprising:
detecting a number of unexecuted commands in each of the plurality of solid state drives;
suppressing issuance of requests to process the write-back with respect to one or more solid state drives in the group including a solid state drive whose number of unexecuted commands exceeds a first threshold;
detecting a number of concurrently issued requests to process the write-back for the group;
suppressing issuance of requests to process the write-back when the detected number of concurrently issued requests to process the write-back for the group exceeds a second threshold;
generating, for the grow, statistical information related to issuance of requests to process the write-back; and
updating one of the first threshold and second threshold, based on the statistical information generated for the group.

10. A storage control method of a storage control apparatus which controls write-back of data stored in a write-back cache with respect to a group including a plurality of solid state drives, the storage control method comprising:
detecting, by a computer, a number of unexecuted commands in each of the plurality of solid state drives;
suppressing, by the computer, issuance of requests to process the write-back with respect to one or more solid state drives in the group including a solid state drive whose number of unexecuted commands exceeds a first threshold;
detecting, by the computer, a number of concurrently issued requests to process the write-back for the group;
suppressing, by the computer, issuance of requests to process the write-back when the detected number of concurrently issued requests to process the write-back for the group exceeds a second threshold;
generating, by the computer and for the group, statistical information related to issuance of requests to process the write-back; and
updating, by the computer, one of the first threshold and second threshold, based on the statistical information generated for the group.

* * * * *